United States Patent
Bäuerle et al.

(10) Patent No.: US 7,318,576 B2
(45) Date of Patent: Jan. 15, 2008

(54) BI-DIRECTIONAL AIR VALVE FOR A TANK SYSTEM OF A MOTOR VEHICLE

(75) Inventors: Matthias Bäuerle, Wassertrüdingen (DE); Thomáš Podlena, Plzen (CZ)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 20 days.

(21) Appl. No.: 11/139,401

(22) Filed: May 27, 2005

(65) Prior Publication Data

US 2006/0186366 A1    Aug. 24, 2006

(30) Foreign Application Priority Data

May 27, 2004   (DE) ................ 10 2004 026 268

(51) Int. Cl.
*F16K 31/02* (2006.01)
(52) U.S. Cl. .................... 251/129.06; 251/129.11; 251/250
(58) Field of Classification Search ........... 251/129.06, 251/129.11, 248, 250, 129.01; 239/102.2
See application file for complete search history.

(56) References Cited

U.S. PATENT DOCUMENTS

| | | | |
|---|---|---|---|
| 4,351,350 A | 9/1982 | Crute | |
| 4,392,507 A | 7/1983 | Harris | |
| 4,646,772 A | 3/1987 | Bergsma | |
| 4,655,238 A | 4/1987 | Szlaga | |
| 4,694,847 A | 9/1987 | Szlaga | |
| 4,699,638 A | 10/1987 | Harris | |
| 4,715,403 A | 12/1987 | Szlaga | |
| 4,735,226 A | 4/1988 | Szlaga | |
| 4,742,844 A | 5/1988 | Szlaga | |
| 4,753,262 A | 6/1988 | Bergsma | |
| 4,760,858 A | 8/1988 | Szlaga | |
| 4,770,201 A | 9/1988 | Zakai | |
| 4,790,349 A | 12/1988 | Harris | |
| 4,805,663 A | 2/1989 | Szlaga | |
| 4,815,705 A | 3/1989 | Kasugai et al. | |
| 4,857,793 A * | 8/1989 | Okuno .................. | 310/323.02 |
| 4,886,089 A | 12/1989 | Gabrlik et al. | |
| 4,905,726 A | 3/1990 | Kasugai et al. | |
| 4,953,583 A | 9/1990 | Szlaga | |
| 4,982,757 A | 1/1991 | Ohasi et al. | |
| 4,991,615 A | 2/1991 | Szlaga | |
| 5,027,844 A | 7/1991 | Forsythe | |
| 5,028,244 A | 7/1991 | Szlaga | |
| 5,044,389 A | 9/1991 | Gimby | |
| 5,044,397 A | 9/1991 | Szlaga et al. | |

(Continued)

FOREIGN PATENT DOCUMENTS

EP       0823577 A2    2/1998

(Continued)

*Primary Examiner*—John Rivell
*Assistant Examiner*—John K. Fristoe, Jr.
(74) *Attorney, Agent, or Firm*—Dority & Manning, P.A.

(57) ABSTRACT

The invention includes a bi-directional air release valve for the tank system of a motor vehicle having an inlet opening, an outlet opening, a valve seat placed between the openings, and a closure element. In a closed position the closure element blocks the flow communication between the inlet and outlet openings and in its opened position releases the blockage. The closure element is activated by a motor such that it may be adjusted to bring about optional intervening positions.

5 Claims, 6 Drawing Sheets

U.S. PATENT DOCUMENTS

Figure 1:
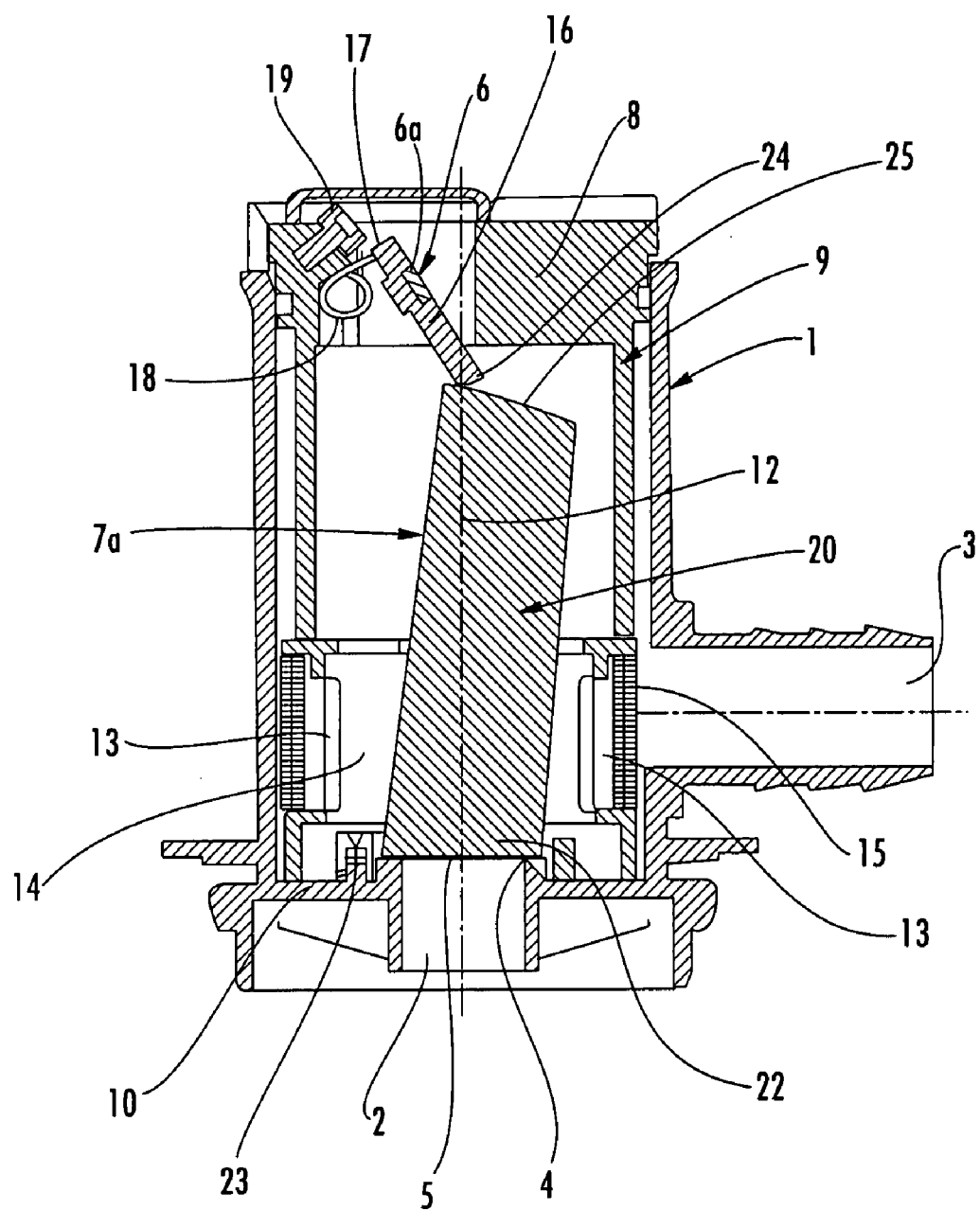

| | | | |
|---|---|---|---|
| 5,062,444 A | 11/1991 | Bergsma | |
| 5,065,782 A | 11/1991 | Szlaga | |
| 5,111,837 A | 5/1992 | Morris et al. | |
| 5,116,257 A | 5/1992 | Szlaga | |
| 5,183,087 A | 2/1993 | Aubel et al. | |
| 5,234,013 A | 8/1993 | Roetker | |
| 5,234,022 A | 8/1993 | Harris | |
| 5,261,439 A | 11/1993 | Harris | |
| 5,277,168 A * | 1/1994 | Kondo et al. | 123/519 |
| 5,341,679 A | 8/1994 | Walkowski et al. | |
| 5,402,818 A | 4/1995 | Kasugai et al. | |
| 5,404,907 A | 4/1995 | Benjey et al. | |
| 5,449,018 A | 9/1995 | Harris | |
| 5,449,029 A | 9/1995 | Harris | |
| 5,497,800 A | 3/1996 | Ohashi et al. | |
| 5,518,018 A | 5/1996 | Roetker | |
| 5,524,662 A | 6/1996 | Benjey et al. | |
| 5,529,086 A | 6/1996 | Kasugai et al. | |
| 5,529,282 A * | 6/1996 | Lebkuchner | 251/129.12 |
| 5,535,772 A | 7/1996 | Roetker et al. | |
| 5,564,466 A | 10/1996 | Aoyama et al. | |
| 5,566,705 A | 10/1996 | Harris | |
| 5,582,198 A | 12/1996 | Nagino et al. | |
| 5,590,697 A | 1/1997 | Benjey et al. | |
| 5,603,349 A | 2/1997 | Harris | |
| 5,605,175 A | 2/1997 | Bergsma et al. | |
| 5,640,993 A | 6/1997 | Kasugai et al. | |
| 5,666,989 A | 9/1997 | Roetker | |
| 5,678,590 A | 10/1997 | Kasugai et al. | |
| 5,687,778 A | 11/1997 | Harris | |
| 5,694,968 A | 12/1997 | Devall et al. | |
| 5,738,132 A | 4/1998 | Zakai | |
| 5,755,248 A | 5/1998 | Szlaga et al. | |
| 5,755,252 A | 5/1998 | Bergsma et al. | |
| 5,758,684 A * | 6/1998 | Hudson et al. | 137/269 |
| 5,762,090 A | 6/1998 | Halamish et al. | |
| 5,797,434 A | 8/1998 | Benjey et al. | |
| 5,850,851 A | 12/1998 | Miura et al. | |
| 5,857,491 A * | 1/1999 | Cooke | 137/627.5 |
| 5,860,458 A | 1/1999 | Benjey et al. | |
| 5,950,655 A | 9/1999 | Benjey | |
| 5,960,816 A | 10/1999 | Mills et al. | |
| 5,960,817 A | 10/1999 | Johansen et al. | |
| 5,975,116 A | 11/1999 | Rosas et al. | |
| 5,983,958 A | 11/1999 | Bergsma et al. | |
| 5,996,607 A | 12/1999 | Bergsma et al. | |
| 6,003,499 A | 12/1999 | Devall et al. | |
| 6,026,848 A | 2/2000 | Huynh | |
| 6,035,884 A | 3/2000 | King et al. | |
| 6,058,963 A | 5/2000 | Enge et al. | |
| 6,062,276 A | 5/2000 | Benjey et al. | |
| 6,065,688 A * | 5/2000 | Wilson et al. | 239/99 |
| 6,085,771 A | 7/2000 | Benjey et al. | |
| 6,158,456 A | 12/2000 | Enge | |
| 6,167,920 B1 | 1/2001 | Enge | |
| 6,170,510 B1 | 1/2001 | King et al. | |
| 6,189,567 B1 | 2/2001 | Foltz | |
| 6,199,574 B1 | 3/2001 | Harris | |
| 6,206,057 B1 | 3/2001 | Benjey et al. | |
| 6,240,950 B1 | 6/2001 | Harris | |
| 6,371,146 B1 | 4/2002 | Benjey | |
| 6,439,258 B1 | 8/2002 | Decapua | |
| 6,450,417 B1 * | 9/2002 | Gipson et al. | 239/5 |
| 6,508,263 B1 | 1/2003 | Jahnke et al. | |
| 6,516,835 B2 | 2/2003 | Enge | |
| 6,546,954 B2 | 4/2003 | Sato et al. | |
| 6,557,578 B2 | 5/2003 | Shimamura et al. | |
| 6,561,211 B2 | 5/2003 | Devall | |
| 6,564,822 B2 | 5/2003 | Muto et al. | |
| 6,578,597 B2 | 6/2003 | Groom et al. | |
| 6,581,621 B1 | 6/2003 | Klaffki et al. | |
| 6,588,449 B1 | 7/2003 | Kippe | |
| 6,591,855 B2 | 7/2003 | Nishi et al. | |
| 6,601,617 B2 | 8/2003 | Enge | |
| 6,612,324 B2 | 9/2003 | Szlaga | |
| 6,634,341 B2 | 10/2003 | Cary et al. | |
| 6,675,779 B2 | 1/2004 | King et al. | |
| 6,691,725 B2 | 2/2004 | Zorine | |
| 6,701,950 B2 | 3/2004 | Brock et al. | |
| 6,701,952 B1 | 3/2004 | Ehrman et al. | |
| 6,755,206 B2 | 6/2004 | Nishi et al. | |
| 6,776,182 B2 | 8/2004 | Ishitoya et al. | |
| 6,779,544 B2 | 8/2004 | Devall | |
| 6,848,463 B2 | 2/2005 | Johansen | |
| 6,918,405 B2 | 7/2005 | Leonhardt | |
| 2002/0017281 A1 | 2/2002 | Crary et al. | |
| 2002/0069915 A1 | 6/2002 | Gebhardt et al. | |
| 2003/0066558 A1 | 4/2003 | Muto et al. | |
| 2003/0111111 A1 | 6/2003 | Zorine | |
| 2003/0150492 A1 | 8/2003 | Sato | |
| 2003/0189110 A1 | 10/2003 | Kurihara | |
| 2004/0060596 A1 | 4/2004 | Frohwein et al. | |
| 2005/0045227 A1 | 3/2005 | Frohwein | |
| 2005/0092364 A1 | 5/2005 | Furuya et al. | |

FOREIGN PATENT DOCUMENTS

| | | |
|---|---|---|
| EP | 0941884 A2 | 9/1999 |
| EP | 1323568 A2 | 7/2003 |
| EP | 1325829 A2 | 7/2003 |
| EP | 1332906 A1 | 8/2003 |
| EP | 1255941 B1 | 5/2004 |
| WO | WO 9850717 A1 | 11/1998 |
| WO | WO 0107806 A1 | 2/2001 |
| WO | WO 0107807 A1 | 2/2001 |

* cited by examiner

BI-DIRECTIONAL AIR VALVE FOR A TANK SYSTEM OF A MOTOR VEHICLE

The invention concerns a bidirectional air valve for a tank system of a motor vehicle. Such valves, normally possess one inlet port, one outlet port, a seat located therebetween and a closure element, which closure element, when in its closed position, blocks the flowing connection between the inlet and the outlet ports and frees the same when in its opened position. However, in the case of such valves, used up to the present time, problems continually arising in the desired entry or exit of air have not been satisfactorily resolved. As an example, certain fuel tanks, which have been provided with so-called air venting devices to act during the filling of fuel tanks, release a mixture of air and vaporized fuel (hereinafter, referred to as "gas") to the atmosphere through the vent of an activated carbon filter. Commonly, for control of gas release during the filling of a tank, a float operated valve is provided, affixed to or near an upper tank wall, which said valve, in a case of rising fuel level, shuts itself off at a predetermined fuel level. Subsequently, upon continued filling with even more fuel, a pressure in the tank is created, which finally leads to shut-off of an inserted fuel-input nozzle.

After a certain period of fuel consumption, the fuel level drops to a threshold level, wherein, from that point on, the tank air release valve remains open. In this case, fuel vapors, created by effusion or by an increase in temperature, inevitably migrate to the active carbon filter, thus reducing the adsorbancy capability of the latter. A further problem is, that during the driving operation of the motor vehicle, possibly on a curving street in the summer time, severe fuel backwash within the fuel tank, brings about an increased generation of fuel vapors, especially if the fuel is gasoline. Accordingly, the pressure within the fuel tank causes a correspondingly concentrated emission of gas, which transports itself to the active carbon filter in the form of droplets, which quickly saturate the said filter.

Thus the purpose of the invention is, to propose a two-directional valve for the tank system of a motor vehicle, with which the above described, and similar problems, can be avoided.

This purpose is achieved by a two directional valve, the closure element of which can be displaced in optional intervening positions with the aid of a motor.

A valve of this type offers, besides a shut-off function, also the possibility of controlling and/or regulating a gas flow which is introduced into a tank, or is removed therefrom. In the way of an example, it is possible, with the aid of a pressure sensor to create a pressure related regulation of the release of the defined gas from the tank, in such a manner that the valve, during the driving operation of the vehicle can only be opened at a predetermined positive pressure in the tank, that is, in case this was desired at the beginning of the tank filling process. In this way the closure element is not brought into its open position, in which a flow of gas from the tank chamber can escape nearly without hindrance. The closure element would, in such a case, most likely have been moved into an intermediate location, in which the cross sectional through-put of the valve was only partially available. In the case of excessive pressure in the tank, the quantity of gas flowing out of the tank can be specifically reduced in accord with the intensity of that pressure and in this state, be conveyed to an activated carbon filter. The danger, that liquid fuel could be transported to the tank, is, in this arrangement, extremely reduced. An invented valve can, obviously, be installed as a check valve, in order, for example, to block the outlet vent of the activated carbon filter, which vent is open to the atmosphere.

In the case of a particularly advantageous embodiment of the invention, in accord with claim 2 thereof, a step-down transmission is provided, which, first, is coupled with a drive element of the motor and second, is movably connected with the closure element. By this invented construction, the frequent high forces necessary for the opening of a valve can be replaced by relatively low powered and correspondingly light, small motors. These motors can be step motors or vibration instigated motors. In the case of a stepwise operating motor, the drive component is advantageously a drive-rod. In the case of a vibratory motor, the drive element would be a vibrationally displaceable resonance body. The resonance body would be so coupled with a step-down element so that its vibrations could be transformed into a linear or a rotational motion of a transmission component. Advantageously, piezo-motors are employed, these being that type of a vibration motor, wherein the resonance body, with the aid of a piezo electrical output means, can be set into vibratory motion.

Figure 2:
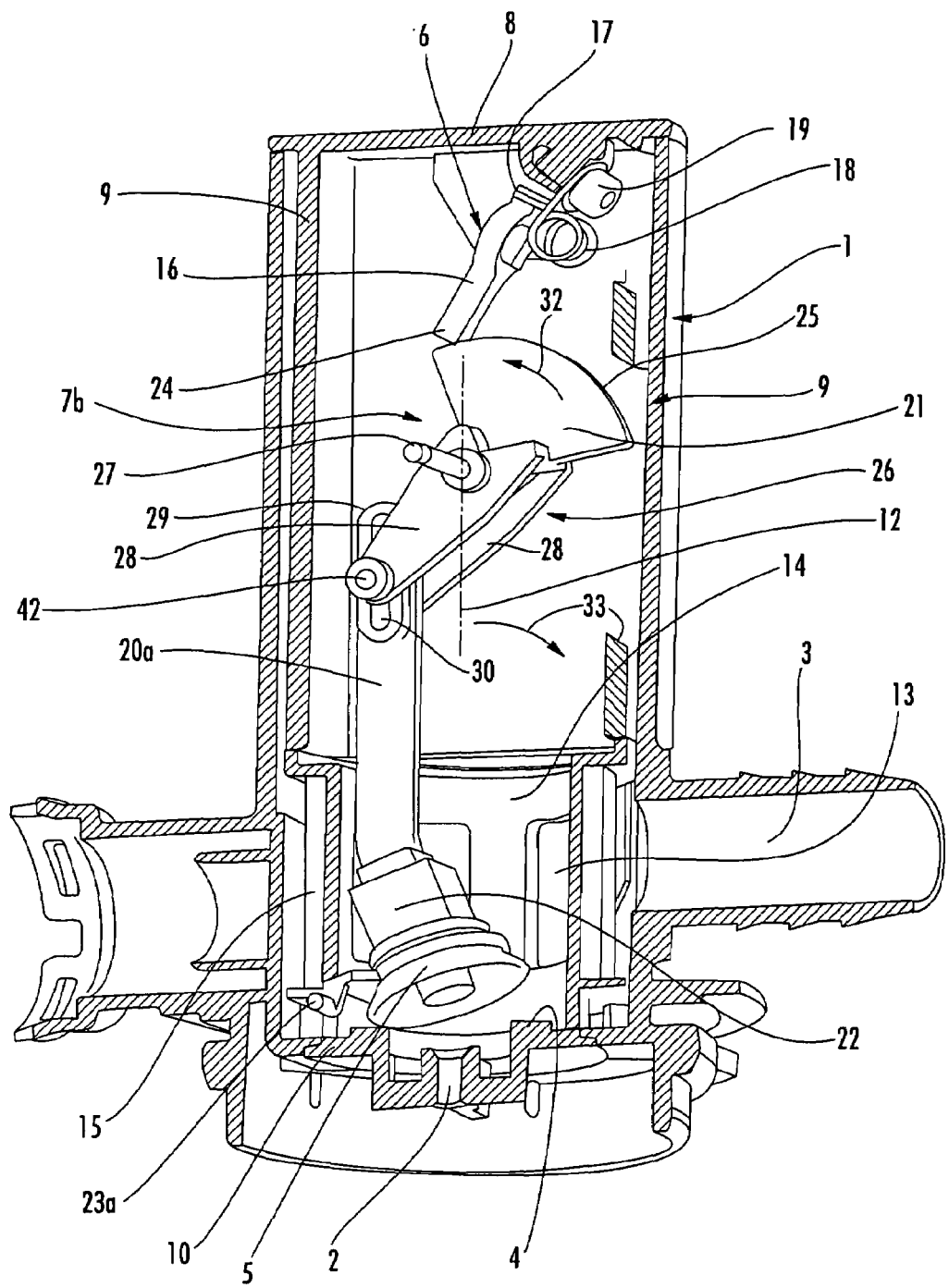
Figure 3:
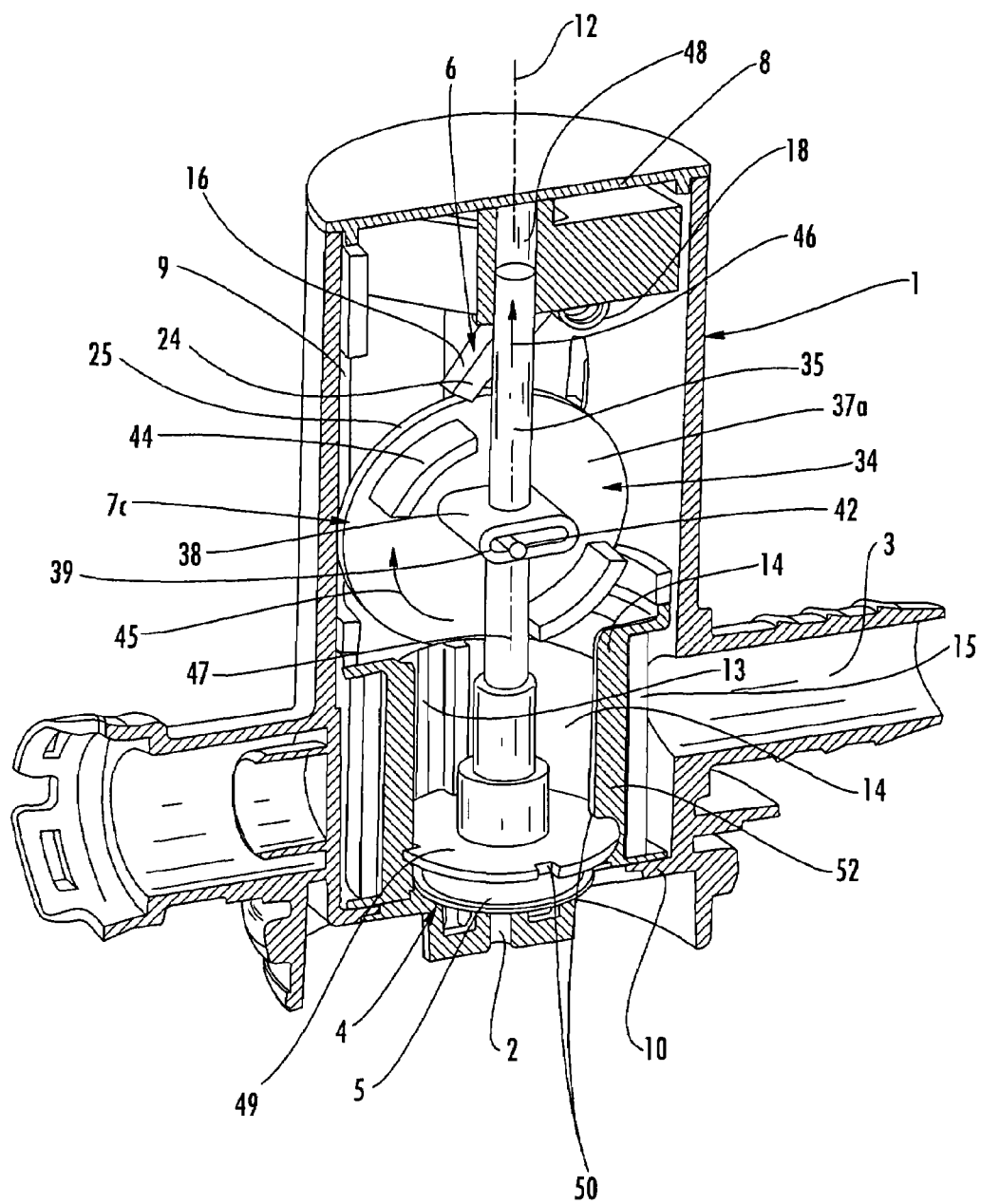
Figure 4:
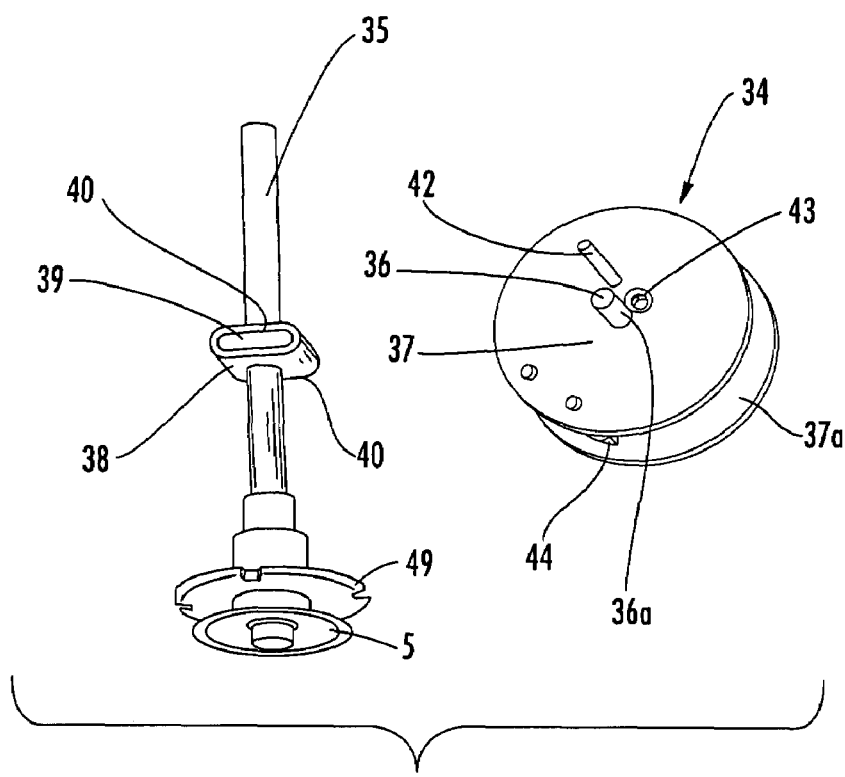
Figure 5:
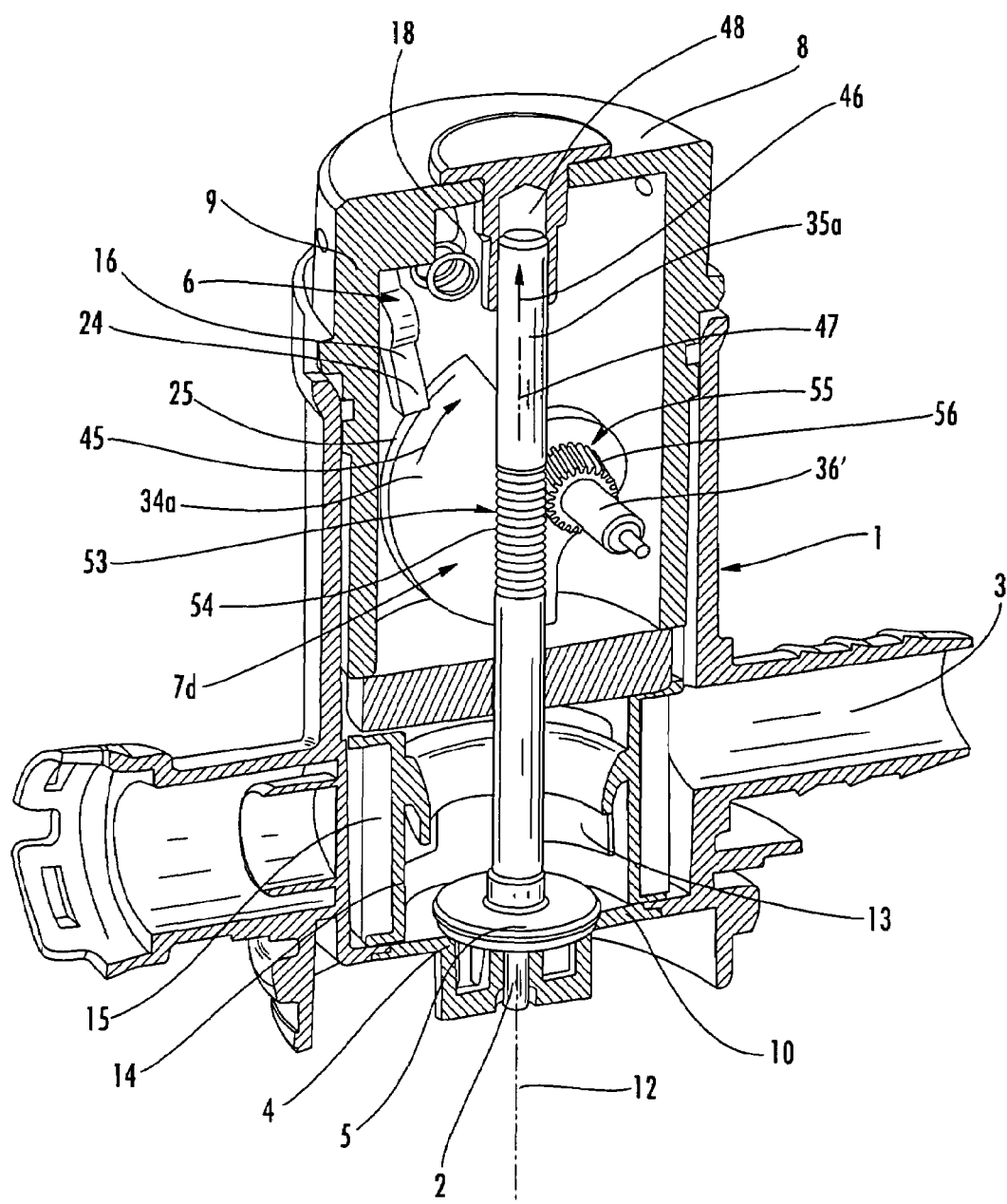
Figure 6:
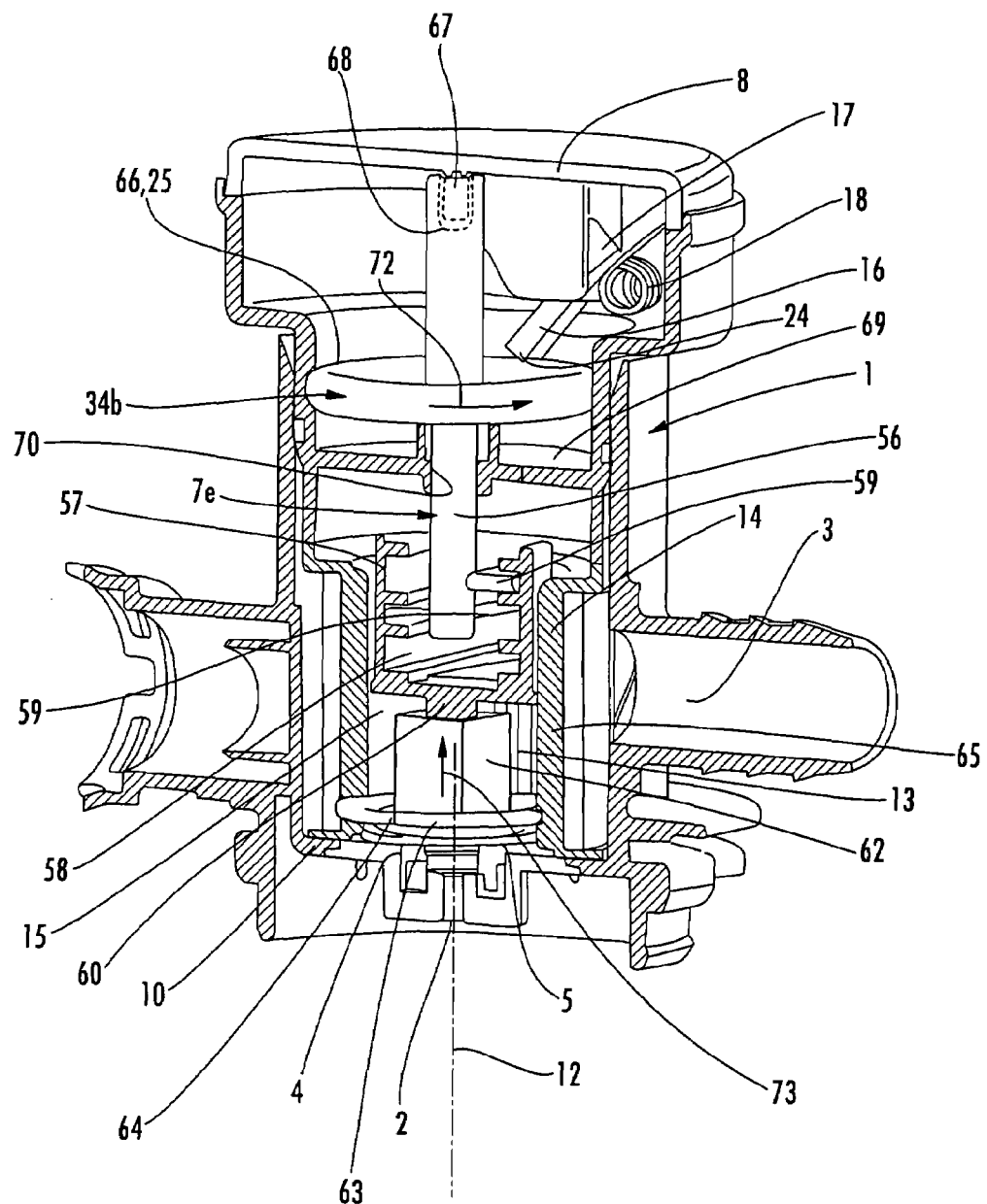

In the subordinate claims are designated advantageous embodiments, the advantages of which are provided in the following description, which is made with the aid of the drawings listed here. There is shown in:

FIG. 1 a longitudinal presentation of a first embodiment example of a bidirectional air release valve, FIG. 2 a perspective, sectional, longitudinal presentation of a second embodiment example of a bidirectional air release valve, FIG. 3 a perspective, sectional, longitudinal presentation of a third embodiment example of a bidirectional air release valve, FIG. 4 in perspective, details of principally a valve stem 35 and a rotational part 34 of the embodiment shown in FIG. 3, FIG. 5 a perspective, sectional, longitudinal presentation of a fourth embodiment example of a bidirectional air release valve, and FIG. 6 a perspective, sectional, longitudinal presentation of a fifth embodiment example of a bidirectional air release valve.

The bidirectional air release valves, (hereinafter, referred to as "valves) which are shown consist of respectively, an essentially cylindrical housing 1, which—as seen in the installed condition—has on its underside an inlet port 2 and on its side, an outlet port 3. Further the valve possesses a valve seat, which encompasses the said inlet port 2, a closure element 5 which coacts with the valve seat 4, and a motor. The motor is, specifically, a piezo-motor 6 with a step-down transmission element 7, the one side of which is movably coupled with the said piezo-motor 6, and indeed in such a manner, that the closure element 5 is movable between, first, a closed position, in which it shuts off the inlet opening 2 and second, an open position, in which it releases said closure of the inlet opening 2, which simultaneously frees an internal flow path from the inlet port to the outlet port.

In addition to this, with the aid of the said piezo-motor 6 and the step-down transmission 7, optional intervening throttling positions are adjustable, so that a regulated opening between the closure element 5 and the valve seat 4 is available and thereby a flow of gas out of the tank, or conversely, into the tank can be controlled. The said essentially cylindrically designed housing 1 possesses on its upper end, an opening, in which is inserted a cup-shaped, insert 9, which is closed by a top cover 8. On the underside, the valve housing 1 is closed by a bottom 10, which is penetrated by the inlet port 2. The valve seat is located above the level of the plane of the said bottom 10 in the direction of the central, axis 12 of the valve seat 4.

Between the bottom 10 and the insert 9 is placed a shell 14, which is penetrated by windows 13. On its outer circumference the shell 14 carries a filter basket 15. In all embodiment examples which follow, the piezo-motor 6 is to be found proximal to the top cover 8. Essentially, the piezo-motor 6 assembly includes one resonance body 16, an end 17 of which is affixed in the top cover 8 via an arm-spring 18 aided by a set screw 19. The construction of the piezo-motor 6 includes also an alternating current controlled piezo crystal 6a, which has been placed in the resonance body 16. The piezo-crystal initiates the vibration of the resonance body 16. The other end 24 of the resonance body 16 acts with the step-down transmission 7 in the manner of a drive. In the case of the embodiment examples as shown in FIGS. 1, 2, the step-down transmissions 7a, 7b are, essentially, formed by an activation lever 20, 20a.

The activation lever 20, 20a, is, in fact, a somewhat plate shaped, longitudinally extended piece, and the end 22 thereof is proximal to the valve seat. This said end 22 is pivotally placed about a first pivot axle 23, 23a, which axle extends itself external to the valve seat 4 and runs parallel to the plane thereof. At the end 22 of the activation lever 20, 20a is affixed the closure element 5, which coacts with the valve seat 4.

In the case of the valve, in accord with FIG. 1, that end 24 of the piezo-motor 6, remote from the arm of the spring 18, applies force against a contact surface 25, which is formed on the upper end face 24 of the activation lever 20, whereby the activation lever 20 rotates coaxially about a pivotal axle 23. The contact surface 25 and a corresponding opposite surface on the end 24 of the piezo-motor 6 are matched together in such a manner, in this, as well as in following embodiments, so that in the presence of a vibrating resonance body 16, a coacting component of the step-down transmission 7 moves. As this said component moves, the activation lever 20 is then caused to rotate in a pivoting motion.

For example, starting from the closed position shown in FIG. 1, as the activation lever rotates to the left about pivot axle 23, the closure element 5 must also pivot to the left, as can be inferred from FIG. 1. By an alteration of the vibrating frequency of the resonance body 16, the direction of this movement can be reversed. The velocity of the pivoting movement of the activation lever 20 is, in this arrangement, so great, that the closure element 5, within fractions of a second, can be displaced from its closed position into its opened position. By means of appropriate control of the piezo-motor 6, optional intervening positions in the closed-open range are possible. Especially, a partial opening for regulating gas flow can be created (not shown) between the valve seat 4 and a tilted closure element 5, which would possibly be controllingly based on the pressure within the fuel tank. Analogous relationships also serve for following embodiment examples. A piezo-motor 6 of the described kind, for example, can be acquired from Elliptec, AG, D-44379 Dortmund.

In the embodiment shown in FIG. 2, the closure element is likewise molded on the lower end of an activation lever 20a. This said lever is not directly subjected to power from a piezo-motor 6, but rather a two arm lever 26 is interposed between the activation lever 20a and the piezo-motor 6. This said lever 26 is rotationally supported on a second pivotal axis 27, which runs parallel to the first pivotal axis 23. Contrary to the embodiment of FIG. 1, the pivotal axle 27 is placed more nearly in the mid section of the housing 1, to allow it to intercept the central, longitudinal axis 12 of the valve seat 4. That arm of the lever 26, which is proximal to the piezo-motor is designed as a circular disc segment 21, the edge face thereof, which is coaxial to the pivotal axle 27, forms that surface which is to coact with the end surface 24 of the piezo-motor 6. The second arm of the lever 26 consists of two partial arms 28, which are separated from one another along the length of the pivotal axle 27. The free ends of the two partial arms 28 enclose between them the upper end 29 of the activation lever 20a. The said free ends of the partial arms 28 are bound together by means of a pin 42, which pin 42 penetrates through an extended slot 30 in the upper end 29 of the activation lever 20a. If the circular disk segment 21 is displaced by the piezo-motor 6 in the direction of the arrow 32, then the activation lever 20a carries out a swinging motion in the direction of the arrow 33. Taking as a starting point, the open position of the closure element 5 as seen in FIG. 2, then this said closure element pivots to regain its closed position, in which it will lie on the valve seat 4. Counter to a direct activation from the piezo-motor, as shown in FIG. 1, the arrangement of FIG. 2 has the advantage, that, at the same step-down ratio, the activation lever 20a requires a lesser space requirement in the pivoting direction, than it does in FIG. 1. Beyond this, because of the extended slot 30, unsatisfactory tolerance conditions between the closure element and the valve seat 4 are compensated for.

Considering now an embodiment example as shown in FIG. 3, the step-down transmission 7 includes a rotational part 34 and a valve stem 35, which stem extends itself coaxially with the central longitudinal axis 12 and carries on its lower end, the closure element 5. The rotational part 34 turns about an axle 36 (see FIG. 4), which runs transverse to, and intercepts the central longitudinal axis 12. The rotational part 34 is, essentially, formed from two circular disks 37, 37a, which are separated from one another along the turning axle 36, and encompass between them a middle area of the valve stem 35. The said turning axle consists of two partial axles 36, 36a, which, are centrally aligned on the outer circular surfaces of the disks 37, 37a. Approximately in the area of the said turning axle 36, the valve stem 35 possesses a widened zone 38, through which the said elongated slot 39 is enclosed, in a direction transverse to the central longitudinal axis 12 of the valve. This zone 38 exhibits two, diametrically, oppositely situated flattened surfaces 40, which coact with the inner sides of the circular disks 37, 38 in the sense of a sliding contact. Eccentric to the turning axle 36, is to be found a pin 42, extending itself parallel thereto. The ends of this pin 42 lie, respectively, in an opening 43 of the circular disks 37, 37a. Between the circular disks 37, 37a, are placed, in addition to the above, two diametrically opposite circular-arc shaped webs 44, the ends of which webs rotationally impact the valve stem 35, serving thus as end detents.

To initiate the turn-activation of the rotational part 34, the end 24 of the resonance body 16 applies force upon the edge surfaces of the circular disk 37a, which said edges form a contact surface 25. In a case of an appropriate selection of the vibration sequence, the rotational part 34 is set in motion, which motion, starting from the situation in FIG. 3, is in the direction of the arrow 45. In this action, the pin 42 is also moved in the same direction. The valve stem 35, which is axially guided on its upper and lower ends, is accordingly raised in the direction of the arrow 46, that is, moved upward along the central longitudinal axis 12. As this occurs, the closure element 5 is lifted from the valve seat 4. The step-down ratio of the aforesaid transmission 7c is determined by the radial distance of separation of the pin 42 from the contact surface 25 and the distance of separation—seen transversely to the central longitudinal axis 47—of the said pin 42 from the axle of rotation 36. The latter distance of separation continually diminishes upon a closing motion and accordingly, the available force increases, so that the closure element 5 in its final closing state, is pressed with a sufficiently large force against the valve seat 4. A guiding means for the upper valve stem end is achieved, in that this inserts itself into a boring 48, which said boring extends itself in the direction of the central axis 47. For the guidance of the lower end of the valve stem 35, thereon is affixed a flange 49, situated at a distance from the closure element 5. In the rim of the flange 49, a plurality of notches 50 has been made, into which axially projecting ribs 52, which protrude from the inner surface of the shell 14, are inserted.

In FIG. 5, an embodiment example is shown, wherein the step-down transmission 7d likewise engages a valve stem 35a. The said valve stem 35a is secured above in a boring 48, which extends itself coaxially with a central longitudinal axis 47. The lower end of the valve stem 35a carries the closure element 5. The step-down transmission 7d includes further a rotational part 34a, which is carried on a axle 36' which runs transversely to the central longitudinal axis 12. The valve stem 35a is placed in such a manner, that its central axis 47 approximately coincides with the central longitudinal axis 12 of the valve seat. In the middle zone of the said valve stem, it possesses a rack winding 53, which is constructed of a plurality of annular, circumferentially equal projections 54, following one another in the axial direction. The turning axle 36' carries a pinion gear 55 with radial teeth projecting outward from the said axle 36'. The pinion gear 55 engages itself with the said rack winding 53 section of the valve stem 35a. The step-down ratio, and therewith the power ratio is determined essentially by the radius of the contact surface 25 and the effective radius of the pinion gear 55. A movement of the turning axle 34a in the direction of the arrow 45 causes a rotation of the pinion gear 55 in the same direction, so that an upward movement of the valve stem 35a results, as shown by the direction of the arrow 46.

In the case of the embodiment example depicted in FIG. 6, the step-down transmission 7e is designed as a screw gearing, with an axially affixed, stationary screw construction engaging an axial movable nut arrangement. The said stationary screw is a stem extending itself in the direction of the central longitudinal axis 12 of the valve seat 4, which, with its lower end, threadedly connects with an inside winding 58 of a nut 57. For this purpose, two or more projections 49 protrude radially outward from the circumference of the stem 56. On its lower end, the nut arrangement carries a polygonal extension 60, which is turnably connected with a component 62, which component, on its underside bears the closure element 5. The component 62 carries an annular flange 63, in the rim of which, notches 64 have been excised. Into these notches 64, engage, respectively, a rib 65, which said rib extends itself radially from the inside of a shell 14 and parallels the central, longitudinal axis 12. In this arrangement, both the said component 62 and the nut 57 do not turn, but remain fixed, however, they can be slidingly moved axially. In the area of its upper end, the stem 56 has a rotational part 34b, rigidly affixed thereon. Out of the upper side thereof, and concentric to the stem 56, runs a collar 66. This collar 66 forms a contacting surface which coacts with the resonance body 16. The upper end of the stem 56 is guided to a pin 67 which extends itself downward from the cover 8 toward the inside, which then fits into an end-face boring 68 of the valve stem 56. Underneath the rotational part 34b, the stem 56 penetrates into a cross-wall 65, which has been provided with a bearing eye 70.

If the rotational part 34b is turned by the piezo-motor 6 in the direction of the arrow 72, this being in the counter-clockwise direction, then the nut 73 moves in the direction of the arrow 73, that is, upward, whereby the closure element rises from the valve seat 4. Also, in this embodiment, a high power application is achieved. The arises from the radii of the rotational part 34b and the inclination of the inside thread 58 of the nut 57.

The invention claimed is:

1. A bi-directional air valve for a tank system of a motor vehicle, the air valve comprising:
   an inlet port;
   an outlet port;
   a sealing valve seat disposed between the inlet and outlet ports;
   a motor, the motor being a vibration motor and having a drive element, the drive element being a resonance body;
   a closure element controllable by the motor, the closure element being configured to seat about the sealing valve to block a flow between the inlet and outlet ports in a closed position and being further configured to unseat from about the sealing valve seat to permit the flow in an open position; and
   a step-down transmission coupled at one end to the drive element and on another end to the closure element, wherein the closure element is controllable by the motor to be set at intervening positions between the closed and open positions.

2. A bi-directional air valve in accord with claim 1, wherein the step down transmission includes a rotational part, the rotational part rotationably mounted on an axle, the axle extending transversely to a central longitudinal axis of the valve seat, the axle having a valve stem extending in a direction of the central longitudinal axis with the closure element affixed thereto, the rotational part defining a contacting surface disposed concentric to the axle and subjected to force from the drive element of the motor for turning, the valve stem and the rotational part motion-coupled such that upon a turning motion of the rotational part, the valve stem is moved in the direction of the longitudinal axis.

3. A bi-directional air valve in accord with claim 2, wherein the drive element defines at least a circular disk segment with an edge thereon, the drive element configured to coact with the edge of the circular disk segment.

4. A bi-directional air valve in accord with claim 2, further comprising a pinion gear disposed on the axle, the pinion gear engageable in a rack section of the valve stem.

5. A bi-directional air valve in accord with claim 1, wherein the vibration motor includes an element of piezo-electrical material configured for producing vibrations.

* * * * *